United States Patent
Bucher et al.

(10) Patent No.: US 8,375,326 B2
(45) Date of Patent: Feb. 12, 2013

(54) CONTEXTUAL-BASED AND OVERLAID USER INTERFACE ELEMENTS

(75) Inventors: Timothy Bucher, Los Altos, CA (US); Arthur Anthonie Van Hoff, Menlo Park, CA (US)

(73) Assignee: Dell Products LP., Round Rock, TX (US)

( * ) Notice: Subject to any disclaimer, the term of this patent is extended or adjusted under 35 U.S.C. 154(b) by 736 days.

(21) Appl. No.: 11/754,842

(22) Filed: May 29, 2007

(65) Prior Publication Data

US 2007/0283292 A1 Dec. 6, 2007

Related U.S. Application Data

(60) Provisional application No. 60/803,507, filed on May 30, 2006.

(51) Int. Cl.
*G06F 3/00* (2006.01)

(52) U.S. Cl. ......... 715/810; 715/834; 715/839; 715/850

(58) Field of Classification Search .................... 715/843
See application file for complete search history.

(56) References Cited

U.S. PATENT DOCUMENTS

| | | | | |
|---|---|---|---|---|
| 5,602,997 A * | 2/1997 | Carpenter et al. | ............ | 715/764 |
| 6,037,937 A * | 3/2000 | Beaton et al. | .................. | 715/764 |
| 6,369,837 B1 * | 4/2002 | Schirmer | ....................... | 715/764 |
| 6,538,635 B1 * | 3/2003 | Ringot | .......................... | 345/156 |
| 6,628,299 B2 * | 9/2003 | Kitayama | ..................... | 345/635 |
| 7,095,367 B2 * | 8/2006 | Fujikawa et al. | ............. | 342/176 |
| 7,161,561 B2 * | 1/2007 | Kitayama | .......................... | 345/9 |
| 2002/0077156 A1 * | 6/2002 | Smethers | ....................... | 455/566 |
| 2003/0018714 A1 * | 1/2003 | Mikhailov et al. | ............ | 709/203 |
| 2004/0053605 A1 * | 3/2004 | Martyn et al. | ................ | 455/418 |
| 2004/0100479 A1 * | 5/2004 | Nakano et al. | ................ | 345/700 |
| 2004/0155909 A1 * | 8/2004 | Wagner | ......................... | 345/854 |
| 2005/0044565 A1 * | 2/2005 | Jerding et al. | ................... | 725/37 |
| 2005/0044577 A1 * | 2/2005 | Jerding et al. | ................ | 725/135 |
| 2006/0075090 A1 * | 4/2006 | Bocking et al. | ............... | 709/224 |
| 2006/0132469 A1 * | 6/2006 | Lai et al. | ....................... | 345/184 |
| 2006/0143574 A1 * | 6/2006 | Ito et al. | ........................ | 715/800 |
| 2006/0146166 A1 * | 7/2006 | Abe et al. | ................. | 348/333.01 |
| 2006/0156256 A1 * | 7/2006 | Lee | ................................... | 715/857 |
| 2006/0253801 A1 * | 11/2006 | Okaro et al. | ................... | 715/810 |
| 2007/0063995 A1 * | 3/2007 | Bailey et al. | .................. | 345/184 |
| 2007/0094597 A1 * | 4/2007 | Rostom | ......................... | 715/700 |
| 2007/0198949 A1 * | 8/2007 | Rummel | ....................... | 715/810 |
| 2007/0226654 A1 * | 9/2007 | Hwang et al. | ................. | 715/841 |
| 2007/0300187 A1 * | 12/2007 | Hama et al. | ................... | 715/830 |
| 2008/0010610 A1 * | 1/2008 | Lim et al. | ...................... | 715/810 |
| 2008/0120112 A1 * | 5/2008 | Jordan et al. | .................. | 704/270 |
| 2008/0168379 A1 * | 7/2008 | Forstall et al. | ................. | 715/778 |
| 2008/0168386 A1 * | 7/2008 | Brinda et al. | ................. | 715/786 |
| 2008/0168479 A1 * | 7/2008 | Purtell et al. | .................. | 719/328 |

(Continued)

OTHER PUBLICATIONS

Sony Ericsson Mobile Communications, Sony Ericsson P900 User Guide Second Edition, Sep. 2003, pp. 1-98.*

*Primary Examiner* — Ryan Pitaro

(74) *Attorney, Agent, or Firm* — Kirton McConkie; Brian Tucker

(57) ABSTRACT

A portable electronics device for displaying a graphical user interface ("GUI") element on a screen of the device includes a screen, a user input device, a GUI element, and a port for receiving audio headgear. Content is displayed on a screen of the device, the content being associated with a function of the device. Upon receiving user input, the GUI element is displayed on the screen by overlaying the GUI element above the content. The GUI element graphically represents one or more menu selection items, permitting the user of the device to select a menu selection item without navigating out of the function of the device prior to selecting the menu selection item.

7 Claims, 3 Drawing Sheets

U.S. PATENT DOCUMENTS

| | | | |
|---|---|---|---|
| 2008/0215978 A1* | 9/2008 | Bamba | 715/713 |
| 2009/0083665 A1* | 3/2009 | Anttila et al. | 715/834 |
| 2009/0100366 A1* | 4/2009 | Fitzmaurice et al. | 715/767 |
| 2010/0026631 A1* | 2/2010 | Pletikosa | 345/169 |
| 2010/0029303 A1* | 2/2010 | Lim et al. | 455/466 |

* cited by examiner

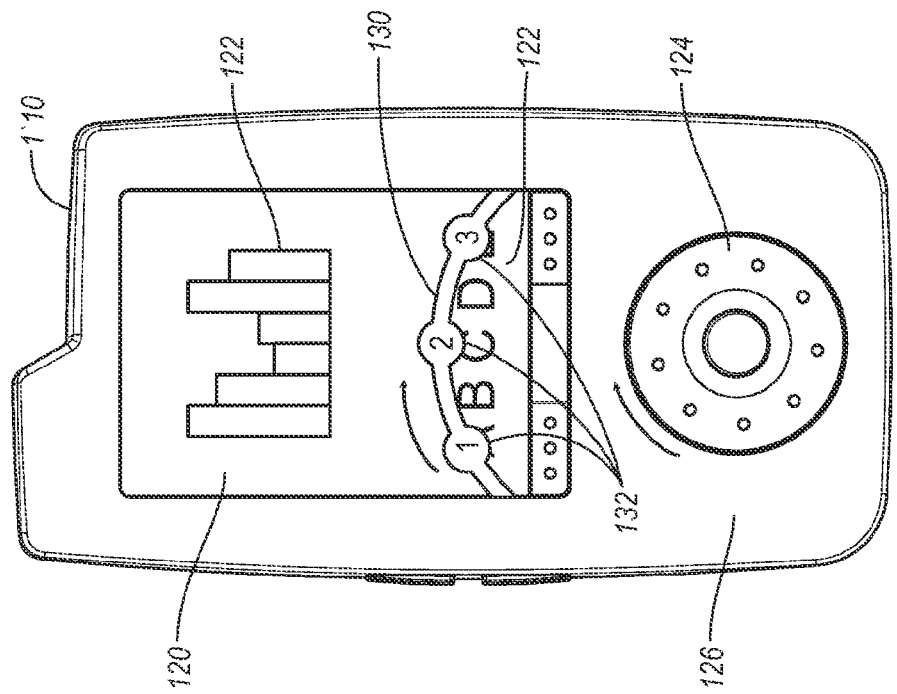
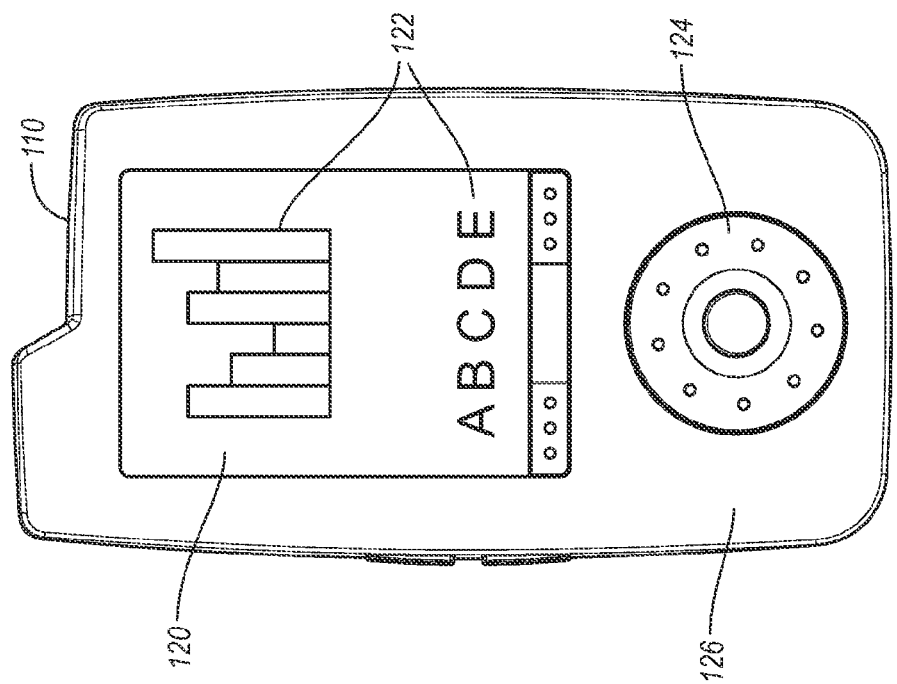

CONTEXTUAL-BASED AND OVERLAID USER INTERFACE ELEMENTS

CROSS-REFERENCE TO RELATED APPLICATIONS

This application claims the benefit of U.S. Provisional Patent Application Ser. No. 60/803,507 filed May 30, 2006, which application is incorporated herein by reference in its entirety.

BACKGROUND OF THE INVENTION

1. The Field of the Invention

The present invention relates to graphical user interface elements and methods associated with electronics devices. More particularly, embodiments of the invention relate to graphical user interface elements that are displayed on a screen of the electronics device in response to manipulation of user input devices associated with the electronics device by being overlaid on or above other content already displayed on the screen.

2. The Relevant Technology

Portable electronics devices, such as personal audio players, personal digital assistants, mobile telephones, etc. are in widespread use. Many electronics devices are being developed with a combination of features and functionalities, such as playing audio content (stored or broadcast), Internet access, telecommunication (telephone service, instant messaging, e-mail, text messaging), capturing and viewing photos, etc. As portable electronics devices have become more complex, the need for providing intuitive and simple navigation and menu selection features has become more pronounced.

In conventional electronics devices, the user is forced to navigate (i.e., back out of) a series of hierarchically-related screens to access a top-level menu. For instance, if a user wants to discontinue listening to stored music and instead use a friends/buddy list to send an instant message to another party, the user has conventionally been required to navigate out of the music interface, access a top-level menu and select the instant message functionality of the electronics device. In fact, the user often must navigate out of one activity to even obtain a list of the other available activities. This may take significant time and effort and interrupt the device's logical use model.

In view of the foregoing, there is a need for user input and graphical user interface systems and methods that are simpler to use and enable users to navigate through various features and functionalities of portable electronics devices with ease.

BRIEF SUMMARY OF THE INVENTION

These and other limitations are overcome by embodiments of the present invention, which include a portable electronics device. The portable electronics device comprises a screen for displaying content, a user input device for receiving user input, and a graphical user interface element ("GUI") displayable on the screen in response to receiving user input. The portable electronics device may additionally have a port for receiving audio headgear (e.g., head phones) and a port for connection to a docking station or other connector. Advantageously, the present invention permits a user of the device to select a menu selection item graphically represented on the GUI element without navigating out of content displayed on the screen prior to selecting the menu selection item.

According to embodiments of the invention, the device displays content on its screen, the content being associated with a function of the device. User input is received by the portable electronics device through manipulation of the user input device. In response to receiving the user input, the device displays the GUI element on the screen by overlaying the GUI element on or above the content that is already displayed on the screen. The GUI element graphically represents menu selection items that can be selected by the user without navigating out of the function associated with the content currently displayed on the screen.

These and other advantages and features of the present invention will become more fully apparent from the following description and appended claims, or may be learned by the practice of the invention as set forth hereinafter.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 1A and 1B illustrate an embodiment of a portable electronics device for displaying a GUI element overlaid on or above currently-displayed content;

DETAILED DESCRIPTION OF THE PREFERRED EMBODIMENTS

Figure 2:
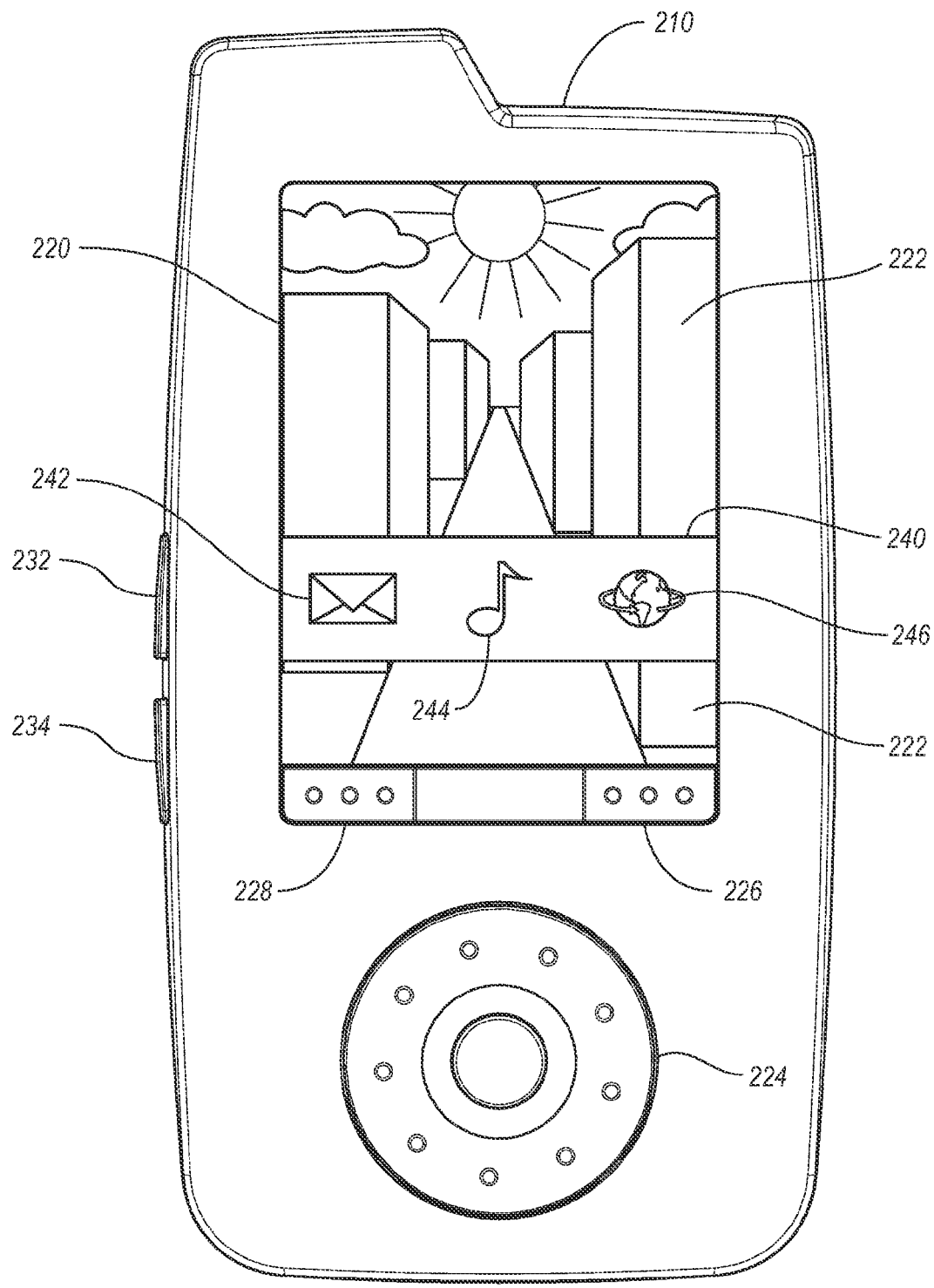
FIG. 2 illustrates another embodiment of a portable electronics device for displaying a GUI element overlaid on or above currently-displayed content.

In the following detailed description of the various embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

According to embodiments of the invention, certain graphical user interface (GUI) elements are displayed on the screen of an electronics device when user input devices on the face or housing of the electronics device are manipulated. The graphical user interface elements are displayed in a manner such that they are overlaid on or above the content that would otherwise be displayed on the screen. The GUI elements can be displayed in this manner without interrupting the activities (media access, data input, telecommunications, etc.) that are being performed by the user who is interfacing with the content on the screen.

In conventional electronics devices, the user is forced to navigate (i.e., back out of) a series of hierarchically-related screens to access a top-level menu. For instance, if a user wants to discontinue listening to stored music and instead use a friends/buddy list to send an instant message to another party, the user has conventionally been required to navigate out of the music interface, access a top-level menu and select the instant message functionality of the electronics device. In fact, the user often must navigate out of one activity to even obtain a list of the other available activities. This not only takes significant time and effort, but also interrupts the use of the electronics device by the user.

In contrast, if the user of a device that operates according to embodiments of the present invention wants to change activities, the top-level menu can be instantly accessed without navigating back out of a series of hierarchically-related screens or interrupting the current activity and the related content being displayed on the screen. Instead, the user manipulates a button, knob, or other input device on the face or housing of the electronics device and can view a menu selection GUI element that is overlaid on or above the content that was currently being displayed on the screen.

According to embodiments of the invention, the menu selection GUI element includes menu selection items corresponding to activities, functions, or content of the device other than the current activity, function or content being accessed and/or displayed by the device. However, this does not preclude the inclusion in the menu selection GUI element of a menu selection item corresponding to the current activity, function or content in addition to the other menu selection items.

According to embodiments of the invention, the GUI element displayed on the screen is graphically related to the user input device that has been manipulated. For instance, if the user input device is a wheel or rotatable knob on the face of the electronics device, the GUI element can be a rotating graphical image. In this example, as the user begins rotating the wheel, the GUI element appears on the screen as an arc (i.e., a segment of a circle) that is representative of a segment of the wheel. As the wheel is rotated, the arc displayed on the screen rotates in lockstep with the wheel. Rotation of the wheel navigates through a series of menu selections, each associated with a "click" or other angular position of the wheel. In one embodiment, the menu selections are not necessarily related hierarchically. This enables a user to access various menus without having to traverse a menu structure. In this manner, the menu selections are highlighted or otherwise presented to the user as candidates for being selected.

One embodiment of a method and device 110 for displaying a GUI element overlaid on or above content previously displayed on a display of the device is illustrated in FIGS. 1A and 1B. The electronics device 110 includes a screen 120 for displaying content 122 associated with an activity. For example, the activity might be outputting music from a personal music library stored on the electronics device 110. Additionally, the device 110 includes a user input means 124, which may be disposed in a face 126 of the device. In the present example, the user input means 124 comprises a rotating wheel, although other user input means 124 can also be used. For instance, the user input means may comprise a touch screen, scroll wheel, one or more soft keys, one or more buttons, and the like or any combination thereof.

While displaying content associated with the activity, the user can rotate the wheel 124 in the face 126 of electronics device 110. As illustrated in FIG. 1B, in response to receiving the initial user input rotating the wheel 124, a GUI element 130 in the form of a rotating arc—corresponding to the rotating wheel—is displayed on screen 120. Advantageously, the GUI element 130 is overlaid on or above content 122 displayed on screen 120. Optionally, the original content 122 can be dimmed relative to an original intensity of the display while the GUI element 130 is displayed at the original intensity, thereby emphasizing the GUI element.

In the present embodiment, the GUI element 130 includes a sequence of menu selection items 132. As previously mentioned, these menu selection items 132 correspond to activities or functions other than the activity or function currently being accessed by the device. For example, these menu selection items may correspond to items in a top level menu of the electronics device 110 or to other menu levels. In some instances, when a user is already at a top level, the GUI element 130 can be configured to present the most commonly used menu entries or can be set by default or present other combinations of menu entries. Thus the ability of a user to access a particular menu entry or menu item can be applied in multiple directions with respect to the menu structure. In each case, the user can access that menu entry without having to traverse the entire menu structure. Thus, although the user of the device 110 may be several tiers down in a hierarchical menu of the device 110, the user need not back out of the hierarchical menu tier by tier before arriving at the top level menu. Furthermore, in some embodiments the user is not required to terminate the content 122 (or the activity associated with the content) currently displayed on the screen 120 to access the top level menu.

For instance, as already mentioned, the content 122 displayed on the screen 120 may be associated with an activity such as outputting music. While listening to the music, the user may desire to send instant messages to a friend. A conventional hierarchical menu might require that the user access, for example, an "entertainment" menu item from the top level menu, a "music" menu item from the next tier menu, an "artist" menu item from the next tier menu, and so on until selecting the particular song or content currently being output by the device 110. To send instant messages to the friend, the user might have to access a "messaging" menu item from the top level menu, an "instant messaging" menu item from the next tier menu, and the friend from the next tier menu. Conventional electronics devices would typically require that the user back out of the music menu currently being accessed by, for example, clicking a button or otherwise providing user input at every tier of the music menu. The present embodiment, however, permits the user to provide user input once to arrive at the top level menu, where the user can then select the messaging menu, etc. As previously indicated, another embodiment contemplates that the GUI element will have an entry that directly allows the user to navigate to the messaging menu.

Returning to FIG. 1B, as the user continues to rotate the wheel 124, the GUI element 130 rotates and navigates through the sequence of menu selection items 132, each associated with a different activity, function, states or other functionality of electronics device 110. The different activities, functions, states or functionalities of the electronics device may comprise, for example, messaging, address book, settings, entertainment, Internet, and the like or any combination thereof. As the wheel 124 rotates and the menu selection items 132 are presented, the user can select and activate a particular menu selection item 132 as desired by, for instance, depressing a button or a portion of the wheel.

The menu selection items and associated functions can vary depending on the particular capabilities of the electronics device. In the example of a personal music and other media content device, the menu selections can include audio content (stored or broadcast), the Internet, friends/buddies (for chat or other communication), e-mail, SMS or other text messaging, etc.

The present invention extends to methods of displaying the GUI elements of the invention and receiving user input that initiates the display of the GUI elements or that controls the display or selection of menu selection items on the GUI elements. The invention also extends to electronics devices and other systems that employ such GUI elements or methods.

Although the invention has been described herein primarily in the context of a rotating GUI element that corresponds to motion of a wheel, the invention also extends to other graphical user interface elements that correspond to user input devices of an electronics devices and that are overlaid on or above content already displayed on the screen. For instance, the GUI element as described and illustrated herein is an arc GUI element 30 depicted rotating in a clockwise direction. However, the arc GUI element 30 can also rotate in a counterclockwise direction. Moreover, other graphical treatment of the GUI element is possible, including horizontal, vertical, and diagonal GUI elements, as opposed to an arc GUI element.

FIG. 2 illustrates another embodiment of a method and device 210 for displaying a GUI element overlaid on or above content previously displayed on a display of the device. While similar to the device 110 of FIGS. 1A and 1B, FIG. 2 illustrates a scrolling horizontal GUI element, rather than a rotating arc GUI element. In particular, the device 210 includes a screen 220 for displaying content 222 associated with an activity. In the present example, the activity might be presenting graphic or audiovisual content, such as a movie, movie clip, television show, television clip, multimedia message, photograph, etc. Additionally, the device 210 includes a plurality of user input means, including a rotating wheel 224, soft keys 226, 228 and buttons 232, 234.

In the present embodiment, the user has already activated a GUI element 240 by pressing either one of the two soft keys 226, 228. As can be seen, the GUI element 240 is overlaid on or above the content 222 previously displayed on the screen 220. Furthermore, the GUI element 240 is a horizontal GUI element, corresponding to the horizontal orientation of the input means 226 and 228 relative to each other and the device 210. In another embodiment, a vertical GUI element might be implemented using the buttons 232 and 234. Alternately, the GUI element need not correspond to the user input means. For instance, a vertical GUI element may be implemented with the soft keys 228 and 226, an arc GUI element can be implemented with the buttons 232 and 234, a horizontal GUI element may be implemented with the rotating wheel 224, and so on.

Returning to FIG. 2, the GUI element 240 includes a sequence of menu selection items 242, 244 and 246 corresponding to items in a top level menu. In the present embodiment, item 242 corresponds to a messaging menu, item 244 corresponds to a music menu, and item 246 corresponds to an Internet menu. These particular top level menu items are provided by way of example only, and should not be construed to limit the invention.

In any event, while viewing the content 222, the user can immediately access the top level menu without navigating out of a hierarchical menu by pressing one of the soft keys 226, 228, which causes the GUI element to be overlaid on or above the content 222. Optionally, as discussed above, the content 222 can be dimmed relative to an original intensity of the display 220 while the GUI element 240 is displayed at the original intensity, thereby emphasizing the GUI element. The user can then uses the soft keys 226, 228 to navigate through the sequence of menu selection items 242, 244, and 246. For instance, by pressing the soft key 226 (which is near the right side of the device 210), the menu selection items may all shift to the right, causing item 246 to disappear and a new item to appear at the left side of the GUI element 240. Alternately, by pressing the soft key 228 (which is near the left side of the device 210), the menu selection items may all shift to the left, causing item 242 to disappear and a new item to appear at the right side of the GUI element 240. As the buttons 226 and 228 are pressed and the menu selection items are presented, the user can select and activate a particular menu selection item as desired by, for instance, depressing a button or a portion of the wheel 224, or by providing some other specified input.

Although the invention can be used with a variety of electronics devices, one system that is particularly adapted for use with the invention is an IEEE 802.11 g-enabled personal audio/video device that can receive content over a wireless network. This particular electronics device enables users to access personal music libraries, terrestrial broadcast radio (e.g., FM, etc.), streaming music and other audio content over the Internet and, optionally, other sources of audio content, such as satellite radio broadcasts. These devices also can have other features, such as friends/buddy interaction, telecommunication capabilities, Internet access, text messaging, instant messaging, etc. Each of these features can be associated with a menu selection item that is displayed on the GUI elements of the invention.

Figure 3:
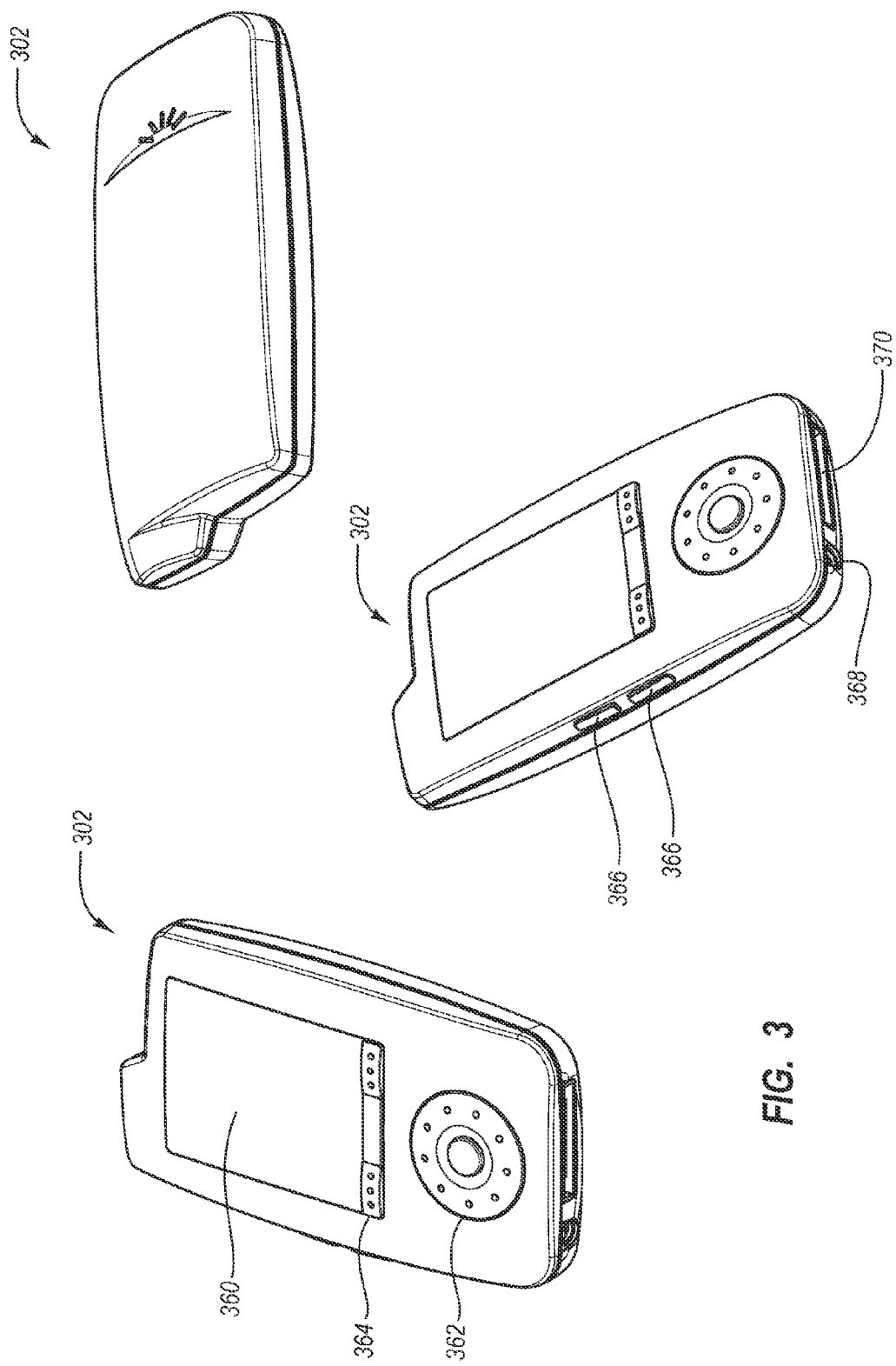
FIG. 3 depicts perspective views of one example of a portable electronics device that is enabled to display a GUI element used for selecting menu items without requiring a user to navigate out of the current function associated with currently displayed content.

FIG. 3 illustrates various perspective views of one embodiment of a media device 302 with display and navigation mechanisms that can be used in conjunction with the features of the present invention. The media device 302 includes a display 360 having various display methods, wherein a GUI interface can be overlaid on or above other content. A user can interact with audio device 302 using a rotating wheel 362, electromechanical keys on a keypad, such as arrow keys and alphanumeric keys, soft keys 364 on display 360, a touch pad, other device buttons 366, a remote control device (not shown) associated with the audio device 302, voice commands, or by moving the communication device in a particular way. The audio device 302 may also include port 368 for connecting audio headgear and port 370 for connecting the audio device 302 to a docking station or connector for charging the audio device. Of course, audio device 302 can include any of a variety of configurations and designs that are contemplated within the scope of the present invention.

Embodiments of the present invention include or are incorporated in computer-readable media having computer-executable instructions or data structures stored thereon. Examples of computer-readable media include RAM, ROM, EEPROM, CD-ROM, or other optical disk storage, magnetic disk storage or other magnetic storage devices, or any other medium capable of storing instructions of data structures and capable of being accessed by portable electronics devices (e.g., personal audio players), general purpose or special purpose computers, personal digital assistants, mobile telephones, and other devices with data processing capabilities. Computer-readable media also encompasses combinations of the foregoing structures. Computer-executable instructions comprise, for example, instructions and data that cause general purpose computers, special purpose computers, or other processing devices, such as personal digital assistants or mobile telephones, to execute a certain function or group of functions. The computer-executable instructions and associated data structures represent an example of program code means for executing the steps of the invention disclosed herein.

The invention further extends to computer systems adapted for use with the GUI elements and methods as described herein. Those skilled in the art will understand that the invention may be practiced in computing environments with many types of computer system configurations, including portable electronics devices, personal computers, multi-processor systems, network PCs, minicomputers, mainframe computers, personal digital assistants, mobile telephones, and the like. The invention can also be practiced in a distributed computing environment, such as the Internet, where tasks are performed by remote processing devices that are linked through a communications network. In the distributed computing environment, computer-executable instructions and program modules for performing the features of the invention may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a portable electronics device, a method for displaying a graphical user interface element on a screen of the portable electronics device, comprising:
   navigating within a hierarchy of user interfaces from an upper-level user interface to a lower-level user interface through one or more intermediate-level user interfaces disposed between the upper-level user interface and the lower-level user interface;
   receiving input that selects a first icon in the lower-level user interface, the first icon being configured to launch a first user application;
   executing the first user application to display content within a user interface of the first user application on the screen of the portable electronics device, the content of the user interface of the first user application being displayed with a first intensity;
   while the first user application is executing and the user interface of the first user application is being displayed on the screen of the portable electronics device, receiving user input through the manipulation of a user input device of the portable electronics device;
   in response to the user input and while the user interface of the first user application is being displayed, displaying the content of the user interface of the first user application with a second intensity that is less than the first intensity, and displaying a graphical user interface ("GUI") element on the screen by overlaying the GUI element on the user interface of the first user application that is being displayed on the screen, the GUI element including a plurality of icons from the upper-level user interface that each are configured to launch a different user application than the first user application, the GUI element being displayed with the first intensity overtop the content of the user interface of the first user application that is being displayed with the second intensity;
   receiving user input that selects one of the plurality of icons from the upper-level user interface;
   in response to the user input that selects one of the plurality of icons, executing a corresponding second user application to display content within a user interface of the second user application thereby permitting the user to select to execute the second user application while the user interface of the first user application is being displayed without navigating back through the one or more intermediate-level user interfaces and without navigating out of the first user application of the portable electronics device prior to selecting the icon.

2. The method of claim 1, wherein:
   the user input device is a rotatable wheel; and
   the GUI element is a rotating arc displayed on the screen.

3. The method of claim 2, further comprising displaying the plurality of icons along a segment of the rotating arc.

4. The method of claim 2, further comprising, in response to receiving user input rotating the rotatable wheel, rotating the GUI element in lockstep with the rotatable wheel.

5. The method of claim 1, wherein:
   the user input device is oriented horizontally with respect to the screen of the portable electronics device; and
   the GUI element is displayed horizontally on the screen.

6. One or more computer storage devices storing computer executable instructions which when executed by a processor perform a method for displaying a graphical user interface element on a screen of the portable electronics device, comprising:
   navigating within a hierarchy of user interfaces from an upper-level user interface to a lower-level user interface through one or more intermediate-level user interfaces disposed between the upper-level user interface and the lower-level user interface;
   receiving input that selects a first icon in the lower-level user interface, the first icon being configured to launch a first user application;
   executing the first user application to display content within a user interface of the first user application on the screen of the portable electronics device, the content of the user interface of the first user application being displayed with a first intensity;
   while the first user application is executing and the user interface of the first user application is being displayed on the screen of the portable electronics device, receiving user input through the manipulation of a user input device of the portable electronics device;
   in response to the user input and while the user interface of the first user application is being displayed, displaying the content of the user interface of the first user application with a second intensity that is less than the first intensity, and displaying a graphical user interface ("GUI") element on the screen by overlaying the GUI element on the user interface of the first user application that is being displayed on the screen, the GUI element including a plurality of icons from the upper-level user interface that each are configured to launch a different user application than the first user application, the GUI element being displayed with the first intensity overtop the content of the user interface of the first user application that is being displayed with the second intensity;
   receiving user input that selects one of the plurality of icons from the upper-level user interface;
   in response to the user input that select one of the plurality of icons, executing a corresponding second user application to display content within a user interface of the second user application thereby permitting the user to select to execute the second user application while the user interface of the first user application is being displayed without navigating back through the one or more intermediate-level user interfaces and without navigating out of the first user application of the portable electronics device prior to selecting the icon.

7. The one or more computer storage devices of claim 6, wherein the first user application is a multimedia application, and wherein the second application is a messaging application.

* * * * *